(12) United States Patent
Suzuki et al.

(10) Patent No.: US 6,597,472 B1
(45) Date of Patent: Jul. 22, 2003

(54) HALFTONE DOT IMAGE DISCRIMINATION METHOD AND IMAGE PROCESSING DEVICE

(75) Inventors: Hiroyuki Suzuki, Toyokawa (JP); Kenichi Sawada, Toyohashi (JP); Atsushi Ishikawa, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/369,169

(22) Filed: Aug. 5, 1999

(30) Foreign Application Priority Data

Aug. 5, 1998 (JP) .............................. 10-221297

(51) Int. Cl.[7] .............................. G06K 15/00
(52) U.S. Cl. .............................. 358/1.9; 358/2.1
(58) Field of Search .............................. 358/1.1, 1.9, 2.1, 358/3, 3.01, 3.02, 3.09, 3.1, 3.21, 1.13, 538, 450; 382/162, 167, 165, 170, 176, 173

(56) References Cited

U.S. PATENT DOCUMENTS 5,715,073 A * 2/1998 Miller .................... 358/534

FOREIGN PATENT DOCUMENTS

JP          05-048892        2/1993

* cited by examiner

*Primary Examiner*—Arthur G. Evans
(74) *Attorney, Agent, or Firm*—Burns, Doane, Swecker & Mathis, LLP

(57) ABSTRACT

An image processing device and image processing method for discriminating whether or not input image data are a halftone dot image and whether or not the input image data are a color image or a monochrome image, and subjecting the input image data to optimum image processing in accordance with the discrimination results. The image processing device and image processing method outputs images without color bleed or color muddiness by performing optimum image processing on the image data.

6 Claims, 19 Drawing Sheets

| d11 | d12 | d13 | d14 | d15 |
|-----|-----|-----|-----|-----|
| d21 | d22 | d23 | d24 | d25 |
| d31 | d32 | d33 | d34 | d35 |
| d41 | d42 | d43 | d44 | d45 |
| d51 | d52 | d53 | d54 | d55 |

HALFTONE DOT IMAGE DISCRIMINATION METHOD AND IMAGE PROCESSING DEVICE

RELATED APPLICATIONS

This application is based on Application No. HEI 10-221297 filed in Japan, the content of which is hereby incorporated by reference.

BACKGROUND OF THE INVENTION

1. Field of the Invention

The present invention relates to a halftone dot image discrimination method and image processing device applicable to digital copiers and the like.

2. Description of the Related Art

In digital copiers and the like, image data obtained by reading a document are subjected to various image processing in accordance with the type of document image. Types of document images include, for example, text images, variable density images, halftone dot images and the like, and in order to discriminate these image types, the document image is divided into small block areas. For example, to discriminate whether or not an image is a halftone dot image, the halftone dot image discrimination must be performed on each block area.

Conventionally, the methods often used to discriminate a halftone dot image determine whether or not the number of white or black isolated points within a block area exceeds a threshold value. The discrimination result is output as a halftone dot discrimination signal representing whether or not the block area is a halftone dot area. Image processing (smoothing process) is performed to prevent moire in the halftone dot image based on the halftone dot discrimination signal.

In the conventional halftone dot image discrimination methods mentioned above, discrimination simply determines whether or not an image is a halftone dot image regardless of whether the image is a monochrome image (black and white) or color image. As a result, the smoothing process is performed based on the obtained halftone dot discrimination signal.

When the smoothing process is performed, however, the color component tends to enlarge and extend beyond the edge area of the halftone dot image. Accordingly, there is concern of color bleeding through the edge area so as to adversely affect the reproducibility of black color. Furthermore, when the halftone dot image is a color image, there is concern that color muddiness may occur in the edge area due to the smoothing process, thereby reducing the vividness of the color.

SUMMARY OF THE INVENTION

An object of the present invention is to eliminate the previously described disadvantages.

Another object of the present invention is to provide a halftone dot image discrimination method and image processing device for suitably processing monochrome and color halftone dot images, respectively, when performing image processing on halftone dot images.

Still another object of the present invention is to provide a halftone dot image discrimination method and image processing device which prevent color bleed and muddiness.

These and other objects are attained by an image processing device having a halftone dot image discrimination unit for discriminating whether or not an image contained in a predetermined area is a halftone dot image, a color/monochrome discrimination unit for discriminating whether or not an image contained in the predetermined area is a color image or a monochrome image, a first image processor for executing a first image process on the image contained in the predetermined area when the image contained in the predetermined area is a halftone dot image and a color image, and a second image processor for executing a second image process on an image contained in the predetermined area when the image contained in the predetermined area is a halftone dot image and a monochrome image.

The objects of the present invention are further attained by an image processing device having, a divider for dividing image data into blocks, a halftone dot image discrimination unit for discriminating whether or not the image contained in each block is a halftone dot image, a color/monochrome discrimination unit for discriminating whether or not the image contained in each block is a color image or monochrome image, a first image processor for executing a first image process on the image contained in a block when the image contained in that block is a halftone dot image and a color image, and a second image processor for executing a second image process on the image contained in a block when the image contained in that block is a halftone dot image and a monochrome image.

The invention itself, together with further objects and attendant advantages, will be best understood by reference to the following detailed description taken in conjunction with the accompanying drawings.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
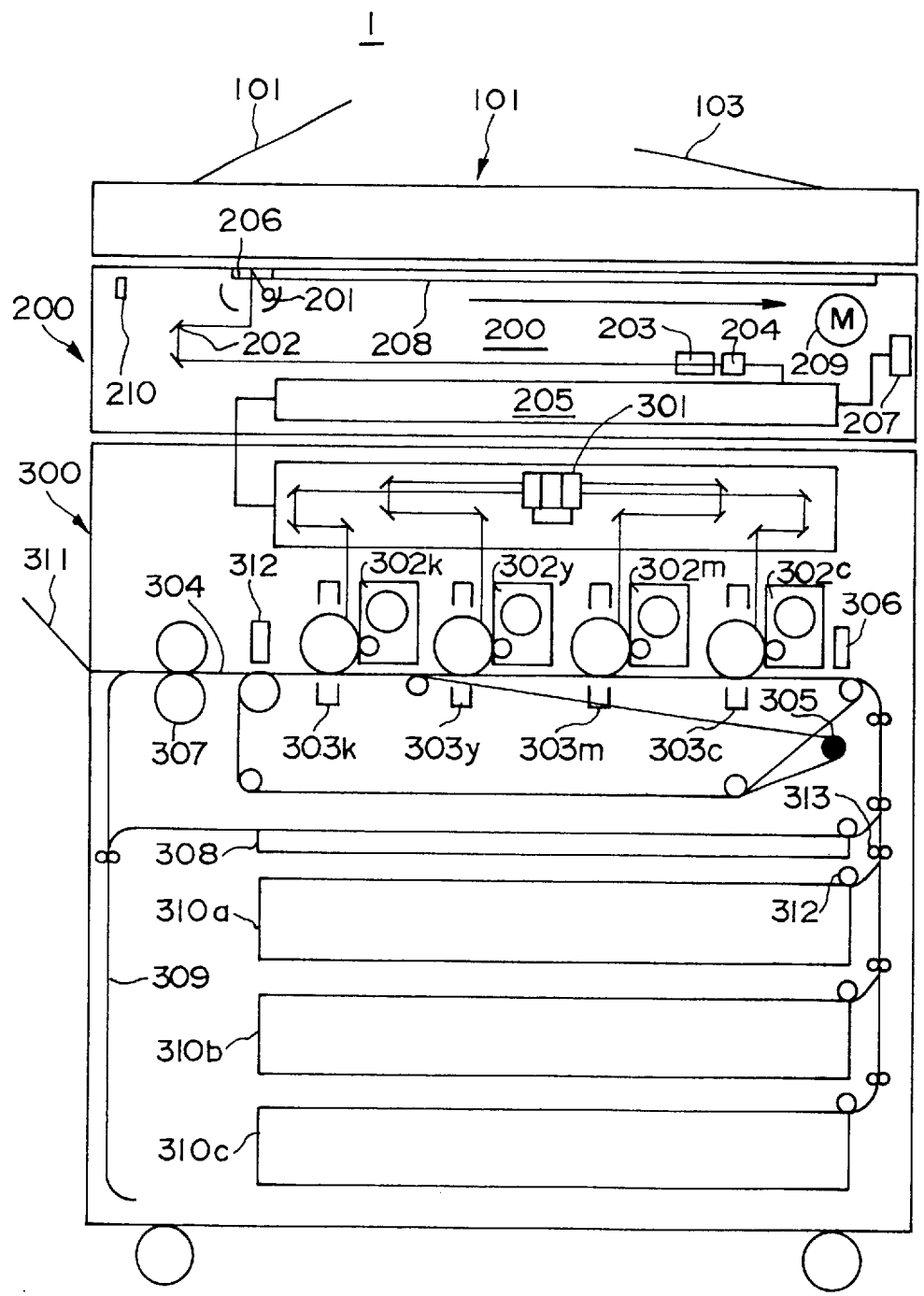
FIG. 1 shows the overall construction of a color copier.

FIG. 1 shows the overall construction of a digital color copier 1 utilizing the halftone dot image discrimination method of the present invention.

In FIG. 1, the copier 1 comprises an automatic document feeder 100, an image reader 200, and an image forming unit 300. Typically, a document transported to an image reading position by the automatic document feeder 100 is scanned by the image reader 200, and the obtained image data are transmitted to the image forming unit 300, which forms an image on a recording sheet. This operation is the copy function. This copier 1 can be connected to peripheral devices via an interface 207. This arrangement allows the realization of an image reading function wherein the image data obtained by the image reader 200 are output to an external device, and a printing function wherein an image is formed by the image forming unit 300 based on image data input from an external device.

The automatic document feeder 100 feeds a document set on a document tray 101 to the image reading position of the image reader 200, and after the image is scanned, ejects the document to a document discharge tray 103. The document transport operation is accomplished in accordance with instructions from an operation panel not shown in the illustration, and the document discharge operation is accomplished based on a reading end signal from the image reader 200. When a plurality of documents are stacked on the document tray 101, these control signals are continuously generated to efficiently perform the various operations to transport documents, read images, and discharge documents.

In the image reader 200 the light reflected from the document on a document glass 208 illuminated by an exposure lamp 201 is directed to a lens 203 by a 3-mirror element 202, and forms an image on a CCD sensor 204. The exposure lamp 201 and a first mirror are drivably moved in the arrow direction via a scan motor 209 at a speed V corresponding to the magnification, so as to scan the entire surface of a document placed on the document glass 208. In conjunction with the scanning by the exposure lamp 201 and the first mirror, the second mirror and the third mirror move in the same direction at a speed V/2. The position of the exposure lamp 201 is calculated and controlled via the amount of movement from the home position, i.e., via detection signals from a scan home position sensor 210 and the number of steps of the drive motor. The light reflected by the document and entering the CCD sensor 204 is converted to electrical signals within the CCD sensor 204, and subjected to analog processing, analog-to-digital (A/D) conversion, and digital image processing by an image processing unit 205, then transmitted via an interface 207 to the image forming unit 300. A white shading correction panel 206 is arranged in proximity to the document reading start position of the document glass 208. Before the document image is read, the shading correction panel 206 is read to generate correction data for a shading correction table.

The image forming unit 300 is described below. The exposure and imaging processes are described first. Image data transmitted from the image reader 200 or the interface 207 are converted to print data of each color cyan (C), magenta (M), yellow (Y), and black (K), and transmitted to a controller of each exposure head not shown in the drawings. In the controller of each exposure head, a laser beam is emitted in accordance with the value of the transmitted image data, and this beam performs a unidimensional scan via a polygonal mirror 301, and optically exposes the photosensitive members within each imaging unit 302c, 302m, 302y, and 302k.

Elements required for electrophotographic processing are provided around the periphery of the photosensitive member within each imaging unit 302c, 302m, 302y, and 302k. A continuous image forming process is accomplished by rotating the C, M, Y, K photosensitive members in a clockwise direction. The imaging units necessary for image formation are integrated for each process, and are detachable from the body. The electrostatic latent image formed on the surface of the photosensitive member within each image forming unit 302c, 302m, 302y, 302k is developed by their respective developing devices. The toner image formed on the surface of the photosensitive member is transferred onto a recording sheet on a sheet transport belt 304 via transfer chargers 302c, 302m, 303y, 303k disposed opposite the photosensitive member within the sheet transport belt 304.

The paper feeding, transport, and fixing operations are described below. The transported sheet is fed to the transfer positions in the following sequence, and the image is formed thereon. Sheets of various sizes are loaded beforehand in the paper cassettes 310a~310c, and a sheet of a desired size is fed to the transport path by take-up rollers 312 mounted on each paper cassette 310a~310c.

The sheet fed to the transport path is transported onto the transport belt 304 by a pair of transport rollers 313. At this time, the transport timing alignment of the transported sheet is accomplished by detecting a standard mark on the transport belt 304 via a timing sensor 306. Three individual registration correction sensors 312 are arranged along the scanning direction on the upstream side of the imaging units 302c, 302m, 302y, 302k. When forming a registration pattern on the transport belt 304, the amount of color dislocation is detected in the main direction and the sub direction of the C, M, Y, K images. Print image correction and image distortion correction are performed by a print image controller (PIC unit) based on the detection results. As a result, color dislocation is prevented on the recording sheet. The toner image transferred onto the recording sheet is fused and fixed thereon via heating by a pair of fixing rollers 307, then the recording sheet is ejected to a discharge tray 311. In the case of duplex copies, in order to form an image on the back side of the recording sheet, the sheet bearing the toner image fixed by the pair of fixing rollers 307 is inverted by a sheet inverting unit 309, and is guided to a duplex unit 308, which re-feeds the recording sheet. The transport belt 304 can be retracted from he C, M, and Y imaging units 302c, 302m, 302y via the operation of a belt retracting roller 305, so that the sheet transport belt 304 does not come into contact with the photosensitive member. When forming a monochrome image, the operation of the imaging units 302c, 302m, 302y can be stopped to eliminate wear on the photosensitive member and the peripheral processing.

Signal processing in the image reader 200 is described below.

Figure 2:
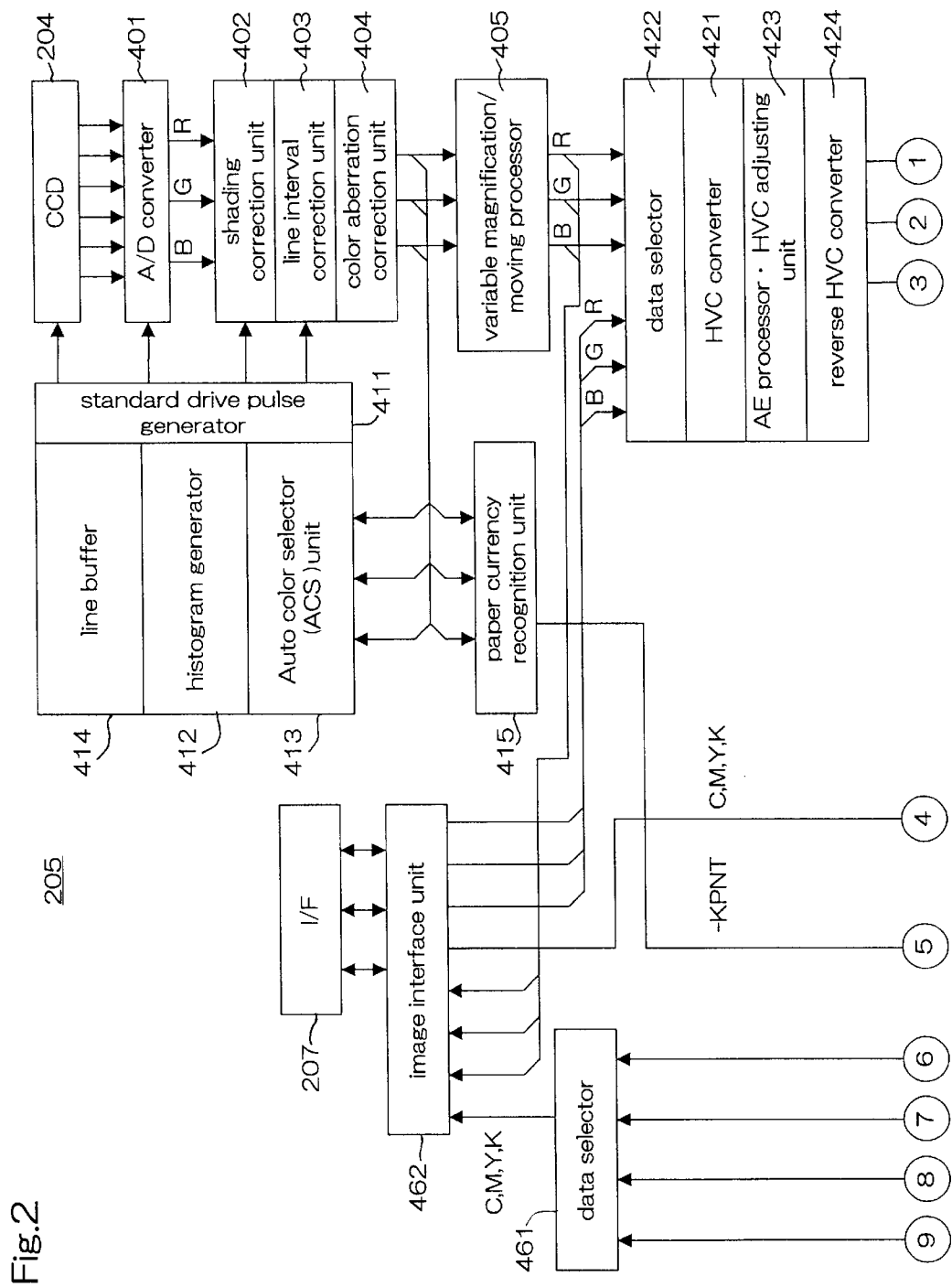
FIG. 2 is a block diagram of the construction of an image processing device in the image reading unit.
Figure 3:
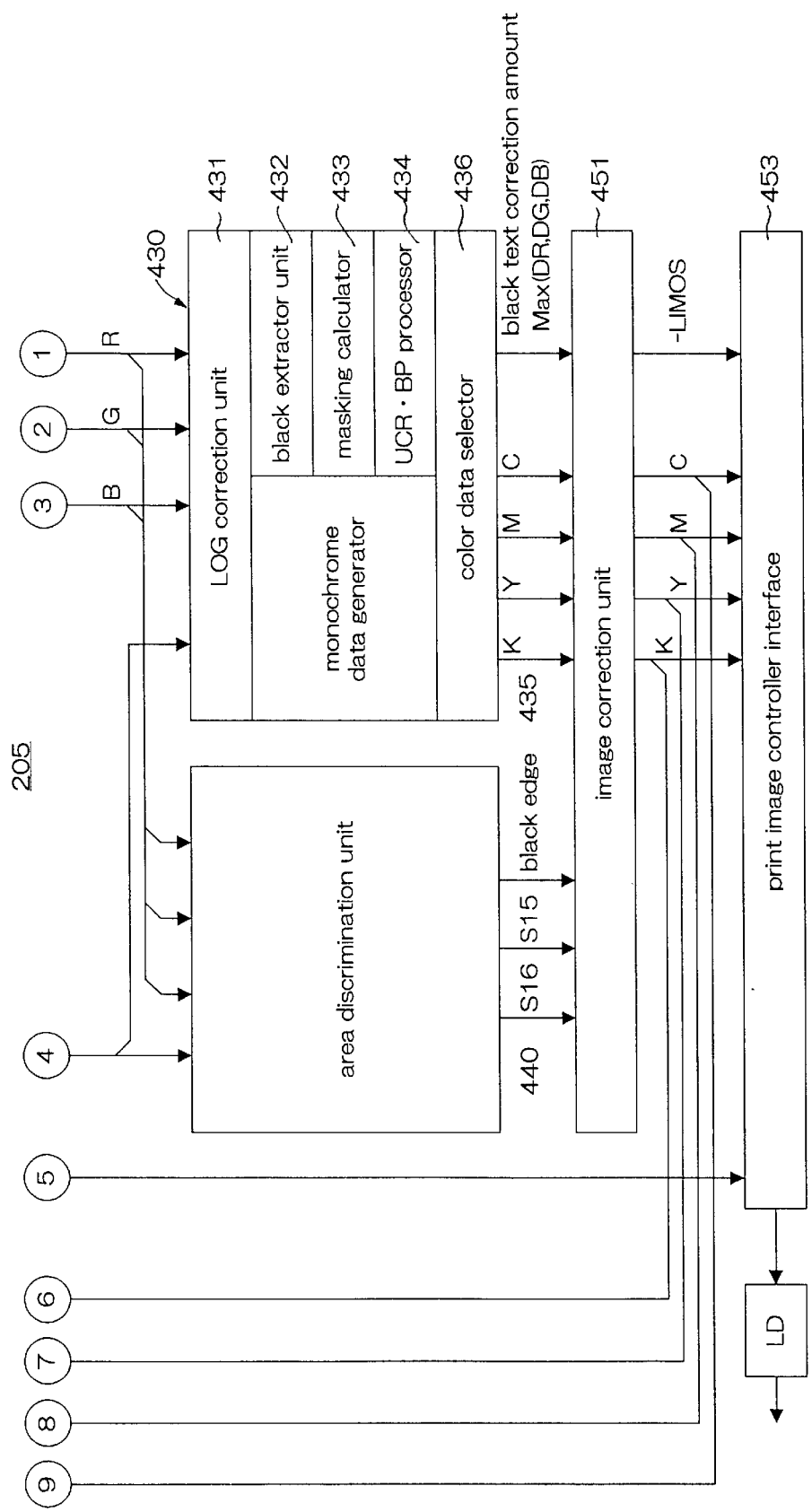
FIG. 3 is a block diagram of the construction of an image processing device in the image reading unit.

FIGS. 2 and 3 are block diagrams showing the construction of an image processor 205 in the image reader 200. FIG. 2 shows the anterior half of the image processor, and FIG. 3 shows the posterior half of the image processor.

In these drawings, the document image is converted to R, G, B color-separated electric signals in accordance with the intensity of the light reflected from the surface of the document via the CCD sensor 204. The reading resolution of the CCD sensor 204 can be switched among 400 dpi, 600 dpi, and 1200 dpi. The AD converter 401 converts the analog signal output from the CCD sensor 204 to 8-bit digital data of 256 gradients for the R, G, B information based on the timing signal output from a standard drive pulse generator 411.

In the shading correction unit 402, the data obtained by reading the shading correction panel 206 for each color independently are stored in an internal shading memory as standard data to eliminate uneven light in the main scan direction of the R, G, B image data. When scanning a document, correction is accomplished by reciprocal conversion of the standard data and multiplying by the image data.

In the line interval correction unit 403, the image data of each color are delayed in line units using the internal field memory in accordance with the scanning speed to align the reading position in the scan direction of the R, G, B sensor chip.

The R, G, B reading phase difference increases near the document edge on the main scan side due to a color aberration phenomenon generated by the optical lens. There is concern that, besides simple color aberration, this influence may produce discrimination errors in black text discrimination and ACS determination described later. This R, G, B phase difference is corrected in the color aberration correction unit 404 based on chroma information.

In the variable magnification/moving processor 405, the a main scan direction variable magnification/movement process is executed by independently controlling the write/read timing to alternate the input/output of each one line using two separate variable magnification line memories for each R, G. B image data. That is, reduction is accomplished by culling data when writing to memory, and enlargement is accomplished by diluting data when reading from memory. In these controls, a complementation process is executed before writing to memory on the reduction side in accordance with variable magnification, and after reading from memory on the enlargement side in accordance with variable magnification, so as to prevent image loss and superscripting. The combination of block control and scan control is performed not only for reduction and enlargement, but also centering, image repeat, enlargement series, bound reduction and the like.

In the histogram generator 412 and auto color selector (ACS) unit 413, brightness data are generated from the R, G, B image data obtained in a preliminary scan prior to operation for copying the document to create a histogram therefrom in memory, and a determination is made as to whether or not each dot is a color dot via the chroma data, and the number of color dots in each dot mesh in all directions of document 512 is generated in memory. Based on these results, a copy background level auto control (AE process) and a color copy operation or monochrome copy operation auto color selection (ACS process) are executed.

The line buffer 414 is provided with a memory capable of storing one line of the R, G, B image data read by the image reader 200, and performs monitoring of image data used for image analysis for auto sensitivity correction of the CCD sensor and auto clamp correction by the AD converter 401.

In the paper currency recognition unit 415, when paper currency such as negotiable securities are stacked for copying on the document glass 208, a determination is made as to whether or not the documents are securities via pattern matching whenever R, G, B data are extracted so as to prevent making a normal copy image. When documents are determined to be paper currency, the CPU controlling the reading operation of the image reader 200 and the image processor 205 immediately outputs a solid print signal (−PNT="L") to the print image controller, and the print image controller switches the k data to solid so as to prohibit normal copying.

In the HVC converter 421, R, G, B data input via the data selector 422 are once converted to brightness (V data) and color difference signals (Cr, Cb data) via 3×3 matrix calculation.

Then, in the AE processor 423, the V data are corrected based on the aforesaid background level control values, and the Cr, Cb data are corrected in accordance with the chroma level and hue level set on the operation panel. Thereafter, in the inverse HVC converter 421, the data are reconverted to the R, G, B data by a 3×3 inverse matrix calculation.

In the color correction unit 430, after the R, G, B data are converted to density data (DR, DG, DB data) by the LOG correction unit 431, the minimum color levels of the DR, DG, DB data are detected as document background components in the black extractor unit 432, and the gradient level difference of the maximum color and minimum color of the DR., DG, DB data are detected as document chroma data.

The DR, DG, DB data are subjected to a 3×6 nonlinear matrix calculation process by the masking calculator 433, and converted to color data (C, M, Y, K data) matching the color toner of the printer.

In the background color removal/black print processor (UCR/BP processor) 434, the UCR/BP coefficients corresponding to the document chroma data are calculated relative to the aforesaid document undercolor component (Min (R,G,B)), and the amount of UCR/BP is determined by a multiplicative process. The amount of undercolor removal (UCR) is differentiated from the C, M, Y data after the masking calculation, and the C, M, Y data and K data (=amount of BP) are calculated. In the monochrome data generator 435, the brightness component is generated from the R, G, B data, and subjected to LOG correction, then the black data (DV data) are output. Finally, in the color data selector 436, the C, M, Y, K data of the color copy image, and the DV data (C, M, Y are white) of the monochrome copy image are selected.

In the area discrimination unit 440, discrimination is performed on each block to determine whether or not the area is a halftone dot image, and if the area is a halftone dot image, to determined whether or not the image is a monochrome image or a color image based on the R, G, B image data input via the data selector 422. The discrimination result is output as a color halftone signal S15 or a monochrome halftone signal S16.

Figure 22:
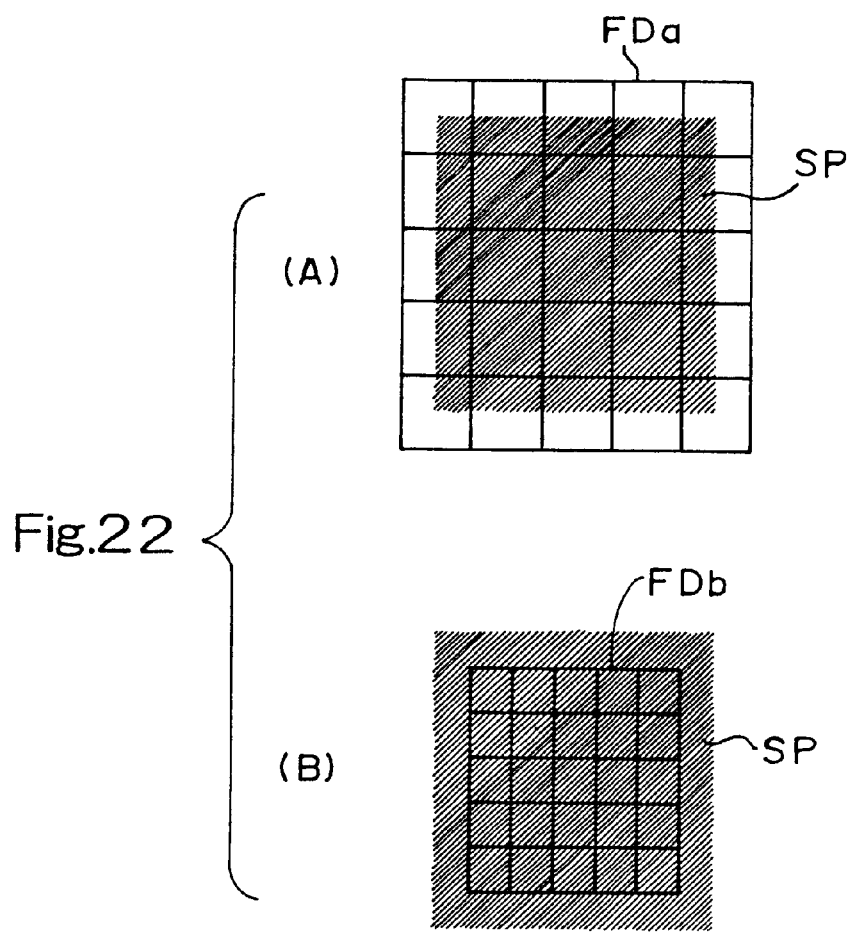
FIG. 22(A) and 22(B) show the reduction of the isolated point by the culling process.

In the discrimination of a halftone dot image, the isolated points SP are detected by applying the isolated point detection filter FD shown in FIG. 1 to the image data. The number of isolated points SP detected within the block area are counted. In this instance, processing is executed to reduce the size of the isolated point SP included in the image data so as to be smaller than the size of the isolated point detection filter FD as shown in FIG. 22(A) and 22(B), in accordance with the image data resolution, and the processed image data are subjected to filtering by the isolated point detection filter FD.

In the determination as to whether or not the image is a monochrome image or a color image, the difference [Max(R,G,B)−Min(R,G,B)] between the minimum color ([Min(R,G,B)] and the maximum color [Max(R,G,B)] is detected. Text shading correction data are generated when discriminating black text, and the transmitted together with the discrimination result to the image correction unit 451. At the same time, the attribute signals are generated for switching the gradient reproduction method transmitted to the print image controller and the print head controller.

In the image correction unit 451, the C, M, Y, K data output from the color correction unit 430 are subjected to edge correction, smoothing text edge removal and the like performed on each discrimination area based on the area discrimination result output from the area discrimination unit 440. Then, the C, M, Y, K data are subjected to mage correction in accordance with the sharpness, color balance, gamma level and the like specified on the operation panel, and the gradient reproduction attribute signals-LOMOS are transmitted to the print image controller interface 453. The C, M, Y, and K data are transmitted to the image interface unit 462 via the data selector 461.

The image interface unit 462 outputs image data to external devices. Simultaneous Input/output of the R, G, B data and sequential input/output of the R, G, B data are possible via the image interface 462. An external device may use the scanning function and printing function of the copier 1.

The area discrimination unit 440 is described below.

Figure 4:
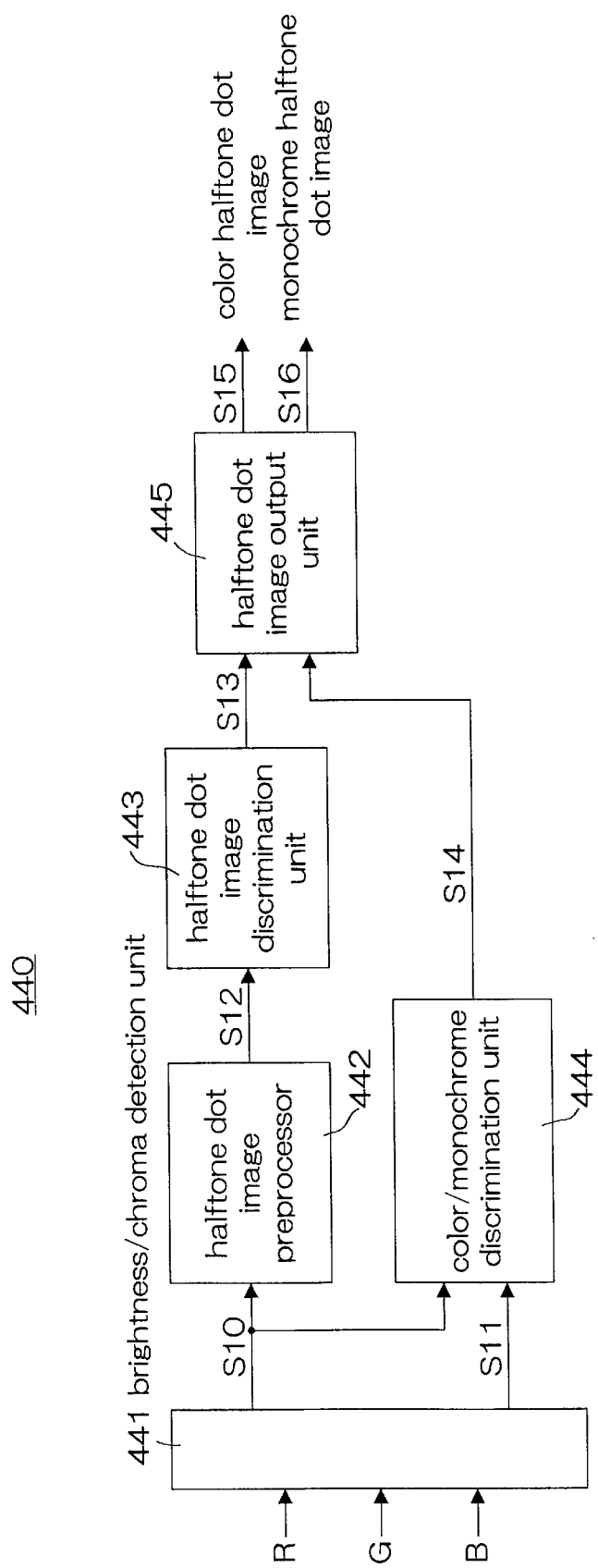
FIG. 4 is a block diagram showing the construction of the area discrimination unit.

FIG. 4 is a block diagram showing the construction of the area discrimination unit 440.

In FIG. 4, the area discrimination unit 440 comprises a brightness/chroma detection unit 441, a halftone preprocessor 442, a halftone dot image discrimination unit 443, a color/monochrome discrimination unit 444, and a halftone dot image output unit 445.

The brightness/chroma detection unit 441 detects the brightness V and the chroma W from the input R, G, B data, and outputs the image data S10 representing the brightness V and image data S11 representing the chroma W. For example, the average value of the R, G, B data may be determined to obtain the image data S10. The difference DF between the maximum color and minimum color of the R, G, B data may be determined to obtain the image data S11 (DF=[Max(R, G, B)Min(R, G, B)]). In the case of monochrome images, the difference DF generally approaches zero [0].

The halftone preprocessing unit 442 executes processing to reduce the size of the isolated points SP included in the image data S10 so as to be smaller than the size of the isolated point detection filter FD in accordance with the resolution of the image data S10.

The halftone image discrimination unit 443 detects isolated points SP in the image data S12 output from the halftone preprocessing unit 442 using the isolated point detection filter FD, and counts the number of isolated points SP detected within the block area BE. The image data S10 are discriminated to determined whether or not the image is a halftone dot image by determining whether or not the number of isolated points SP within the block area BE exceeds a previously set threshold value, and the discrimination result is output as discrimination signal S13.

The color/monochrome discrimination unit 444 discriminates whether the image is a color image or a monochrome image for each block area BE based on the image data S10 and S11. The discrimination result is output as discrimination signal S14.

The halftone dot image output unit 445 outputs a color halftone dot image signal S15 representing the color halftone image, or outputs a monochrome halftone dot image signal S16 representing a monochrome image based on the discrimination signal S13 of the halftone dot image discrimination unit and the discrimination signal S14 of the color/monochrome discrimination unit 444.In the image correction unit 451, image processing is performed on the respective discrimination results for each block area BE based on the color halftone signal S15 and the monochrome halftone dot image signal S16.

The construction of each part of the area discrimination unit 440 is described below. The first embodiment is described first.

First Embodiment

Figure 5:
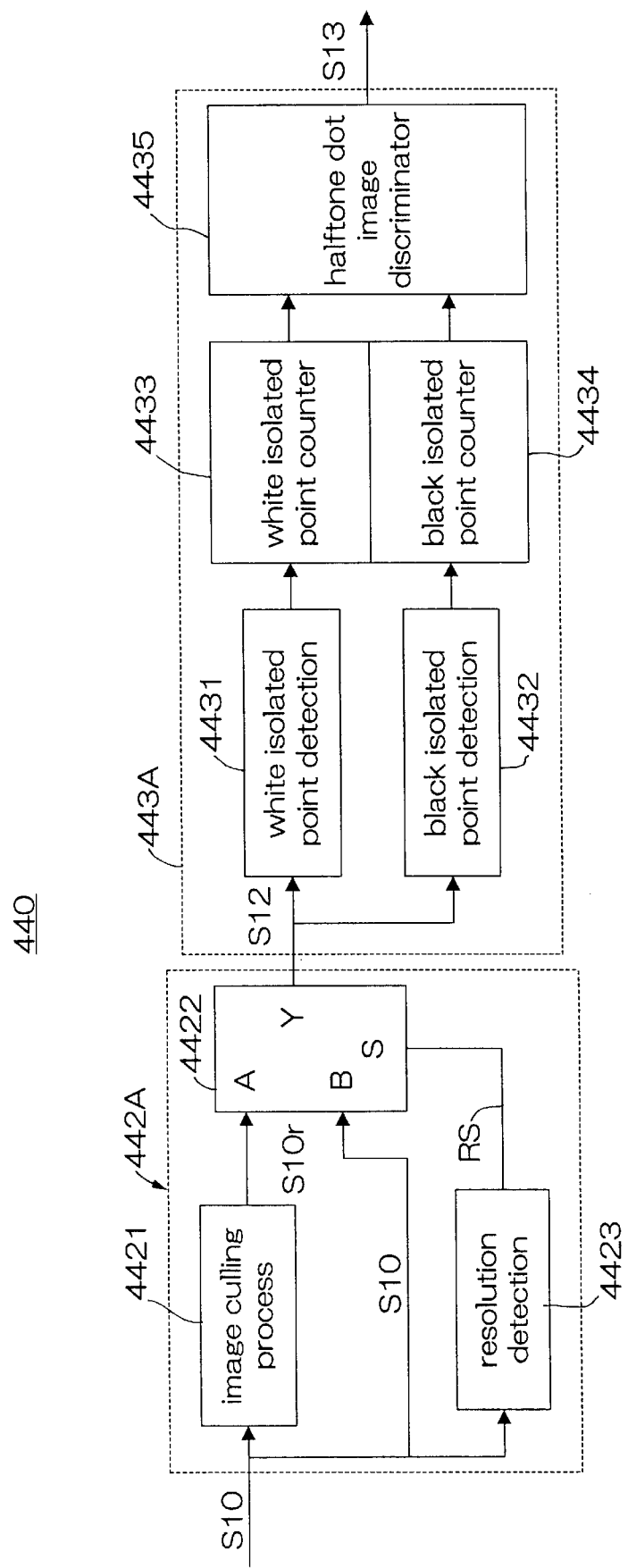
FIG. 5 is a block diagram showing an example of the construction of a halftone dot pre-processing unit and a halftone dot image discrimination unit.

FIG. 5 is a block diagram showing the construction of the halftone preprocessing unit 442A and the halftone image discrimination unit 443A.

In FIG. 5, the halftone preprocessing unit 442A reduces the isolated points SP via a culling process performed on the image data S10. The halftone preprocessing unit 442A comprises an image culling processor 4421, a resolution detector 4423, and a selector 4422.

The image culling processor 4421 performs a culling process on the image data S10 in accordance with the resolution RS of the image data S10, and outputs image data S10r. In the culling process, the number of pixels is reduced by culling specific predetermined pixels from the input image data S10. For example, when the resolution RS is 600 dpi, ⅓ of the pixels are culled from the image data S10, and the image data S10r ⅔ the number of pixels are output. The culling process reduces the number of isolated points SP included in the image data S10 to a size detectable by the isolated point detection filter FD identical to a resolution of 400 dpi.

Figure 6:
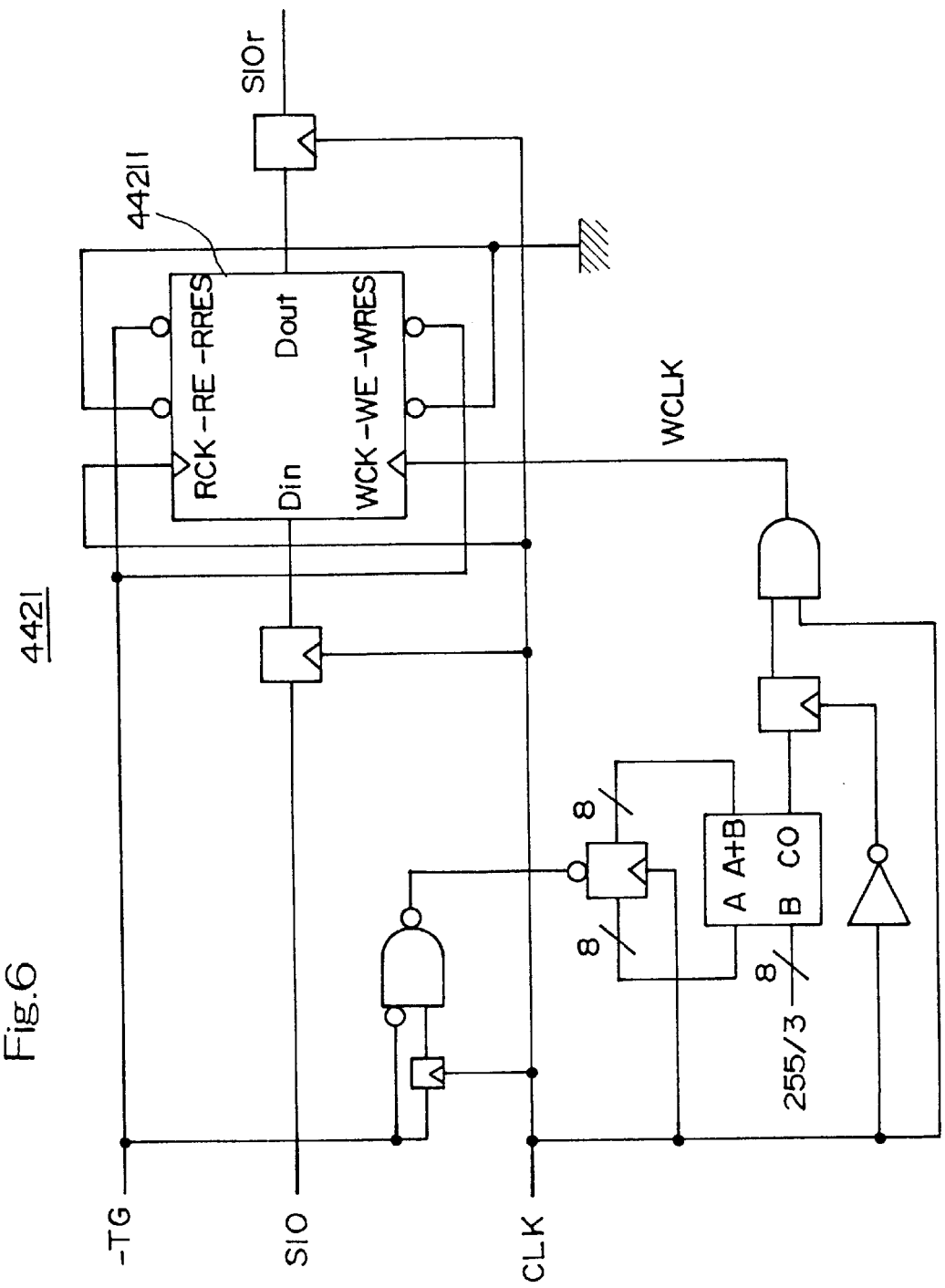
FIG. 6 shows an example of the circuit of the image culling processor.
Figure 7:
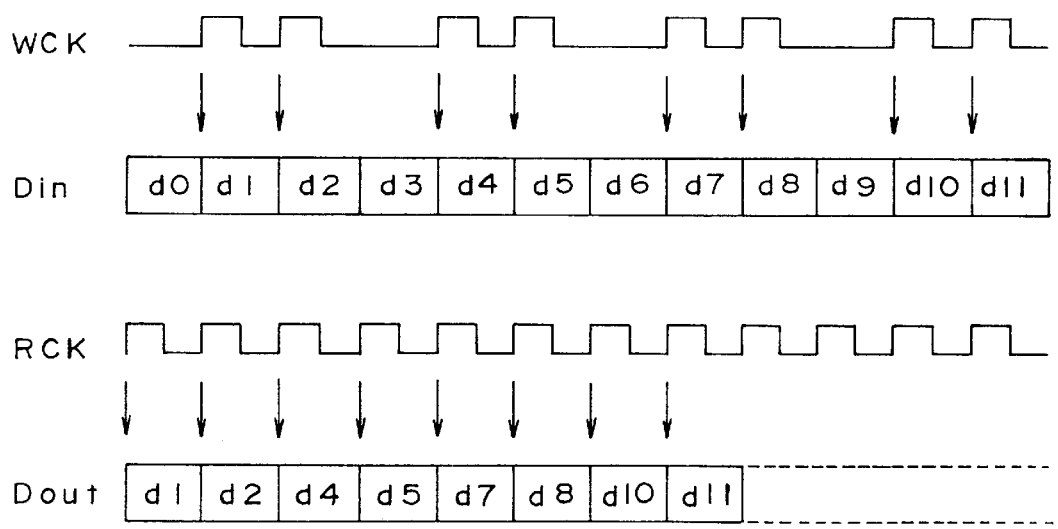
FIG. 7 is a timing chart showing the operation of the image culling processor.
Figures 8, 9:
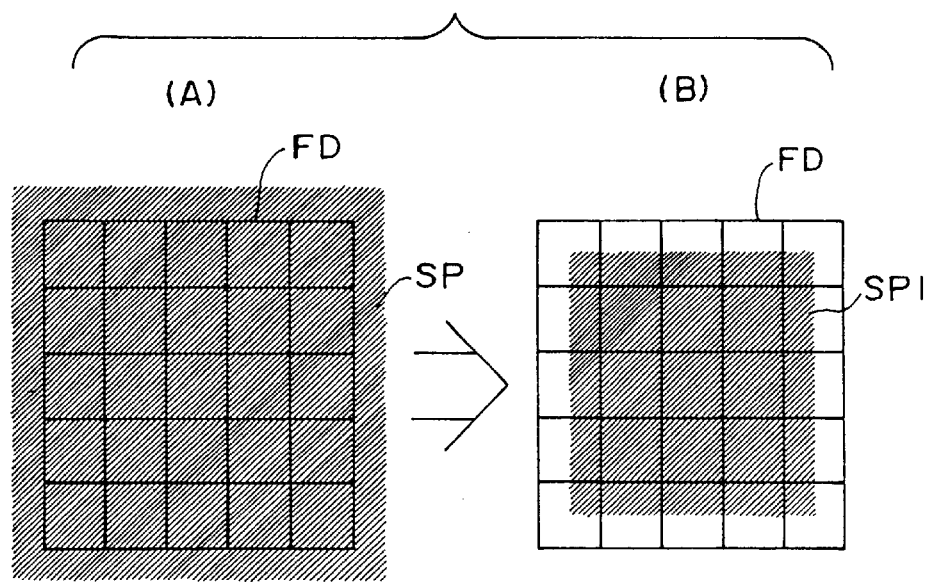
FIG. 8 shows the reduction of the isolated point by the image culling processor.
FIG. 9 shows the isolated point detection filter.
Figure 10:
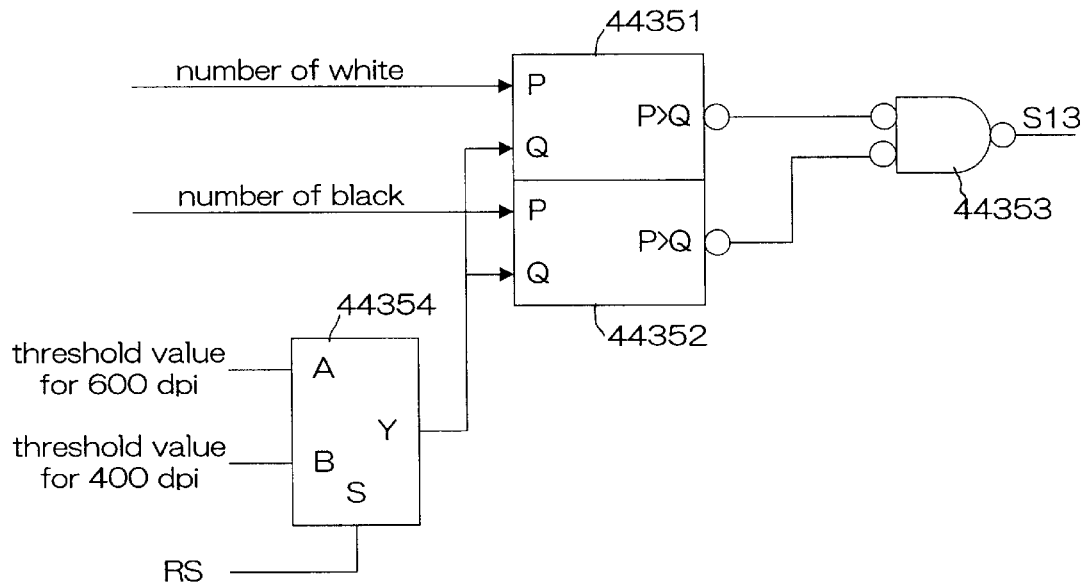
FIG. 10 shows an example of a circuit of the halftone dot discrimination unit.

FIG. 6 is a circuit diagram of the image culling processor 4421, FIG. 7 is a timing chart of the operation performed by the image culling processor 4421, FIG. 8 shows the reduced condition of the isolated points SP accomplished via the image culling processor 4421, FIG. 9 shows the isolated point detection filter FD, and FIG. 10 is a circuit diagram of the halftone dot image discrimination circuit 4435.

In FIG. 6, the culling process circuit 44211 sequentially writes the image data S10 synchronously with a clock signal WCLK input to the write clock pin WCK. The written image data S10 are output synchronously with a clock signal CLK input to the read clock pin RCK. The clock signal CLK synchronizes the output timing of image data S10 of each pixel. The clock signal WCLK omits one of three signals, as shown in FIG. 7. In this way, the only ⅔ of the serially input image data S10 are written to the culling process circuit 44211. Accordingly, the image data S10r read synchronously with the clock signal CLK have been culled ⅔ from the image data S10. The construction and operation of the image culling process circuit 4421 itself are well known.

As shown in FIG. 8, when the isolated points SP are larger than the isolated point detection filter FD, the number of isolated points is reduced via the culling process so that the isolated points SP can be detected by the isolated point detection filter FD.

The resolution RS is detected by the resolution detector 4423. The construction and operation of the resolution detector 4423 itself is well known. The selector 4422 selects either the input image data S10, or the image data S10r culled by the image culling process unit 4421 in accordance with the resolution RS. For example, when the resolution RS is 400 dpi, the image data S10 input to pin B are selected, and when the resolution RS is 600 dpi, the image data S10r input to pin A are selected.

The halftone image discrimination unit 443A comprises a white isolated point detector 4431, a black isolated point detector 4432, a white isolated point counter 4433, a black isolated point counter 4434, and a halftone dot image discriminator 4435.

The white isolate point detector 4431 detects white isolated points SP using a white isolated point filter FDW. The black isolated point detector 4432 detects black isolated points SP using a black isolated point detection filter FDK.

As shown in FIG. 9, the isolated point detection filter FD comprises a 5×5 dot matrix. When this isolated point detection filter FD is used as the white isolated point detection filter FDW, it must be determined whether or not the following conditions are satisfied when the center window V33 is aligned with the target pixel PXT within the block area BE.

$V33 \geq Max(V22, V23, V24, V32, V34, V42, V43, V44)$
$V33 \geq (V11+V22)/2$
$V33 \geq (V13+V23)/2$
$V33 \geq (V15+V24)/2$
$V33 \geq (V35+V34)/2$
$V33 \geq (V55+V44)/2$
$V33 \geq (V53+V43)/2$
$V33 \geq (V51+V42)/2$
$V33 \geq (V31+V32)/2$ When all the aforesaid conditions are satisfied, the target pixel PXT is determined to be a white isolated point SP.

When the isolated point detection filter FD is used a the black isolated point detection filter FDK, the maximum condition is changed to minimum condition, and a determination is made as to whether or not the conditions are satisfied when the direction of the inequality sign is reversed in all instances.

The white isolated point counter 4433 counts the number of white isolated points SP. The black isolated point counter 4434 counts the number of black isolated points SP. The halftone dot image discriminator 4435 compares the number of counted isolated points SP with a previously set threshold value, and determines the area is a halftone dot area when the count value exceeds the threshold value, and outputs this result.

As shown in FIG. 10, in the halftone dot image discriminator 4435, the number of white or black isolated points SP is compared to a threshold value Th by comparators 44351 and 44352. The threshold value Th is set at a threshold value Th4 for 400 dpi, and a threshold value Th6 at 600 dpi. The selector 44354 selects one of these threshold values in accordance with the resolution RS. When the number of isolated points SP exceeds the threshold value Th, a signal representing a halftone dot image is output from the comparators 44311 and 44312, and a discrimination signal S134 is output from the NOR element 44353.

When the size of the block area BE is 9×4 dots, the threshold value Th used for discrimination is, for example, a value of about 5~30. For example, [22] is used as the threshold value Th4, and a value [9] is used as the threshold value Th6.

In the example shown in FIG. 10, the number of white isolated points SP and black isolated points SP are separately compared to the threshold value Th. However, the white and black isolated points SP may be added and that total number compared to another threshold value ThA, and a signal representing a halftone image may be output based on the logical sum of the aforesaid comparison result and the separate comparison results. In this instance, the threshold value ThA is a value somewhat larger than the separate white and black threshold value Th.

Figure 11:
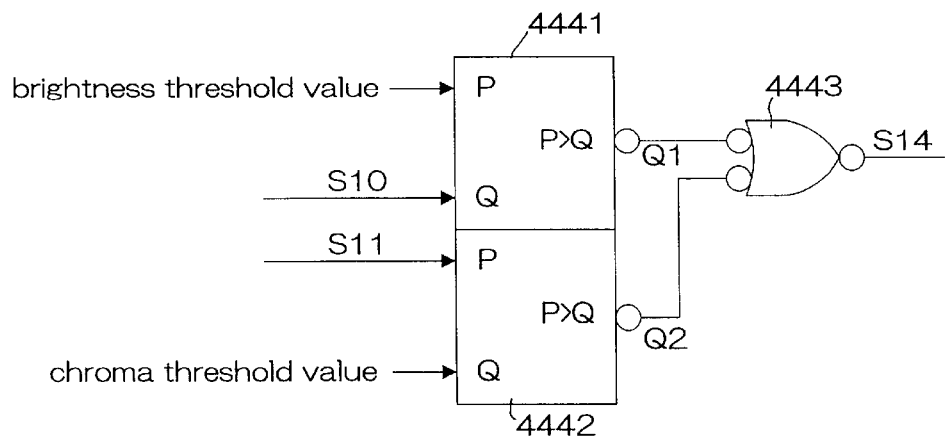
FIG. 11 shows an example of the circuit of the color/monochrome discrimination unit.

FIG. 11 shows the circuit of the color/monochrome discrimination unit 444A.

In FIG. 11, the comparator 4441 compares the brightness threshold value ThV and the image data S10. The comparator 4442 compares the chroma threshold value ThW and the image data S11, and a discrimination signal S14 which is the logical sum of these comparisons is output from the NAND element 4443. That is, when the image data S10 is less than the brightness threshold value ThV and the image data S11 is greater than the chroma threshold value ThW (i.e., when the image data have a predetermined brightness and predetermined chroma), the image data S10 are discriminated as a color image.

In this way, color images having the dim brightness of yellow color or red color are not designated color images. That is, images having a high degree of brightness are not designated color images. Only dark, high density images are designated color images. This designation is because blue and green colors have high density and minimal brightness, whereas red and yellow colors have high density but relatively higher brightness.

Figure 12:
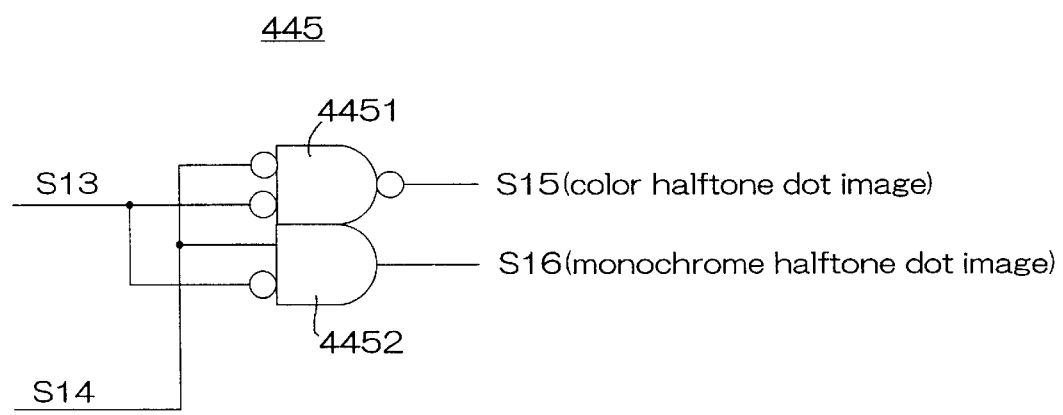
FIG. 12 shows an example of the construction of the halftone dot output unit.

FIG. 12 shows the circuit of the halftone output unit 445.

In FIG. 12, a color halftone signal S15 representing a color halftone image is output from the AND element 4451. A monochrome halftone signal S16 representing a monochrome halftone image is output from the AND element 4452.

The construction and processes of the image correction unit 451 are described below.

Figure 13:
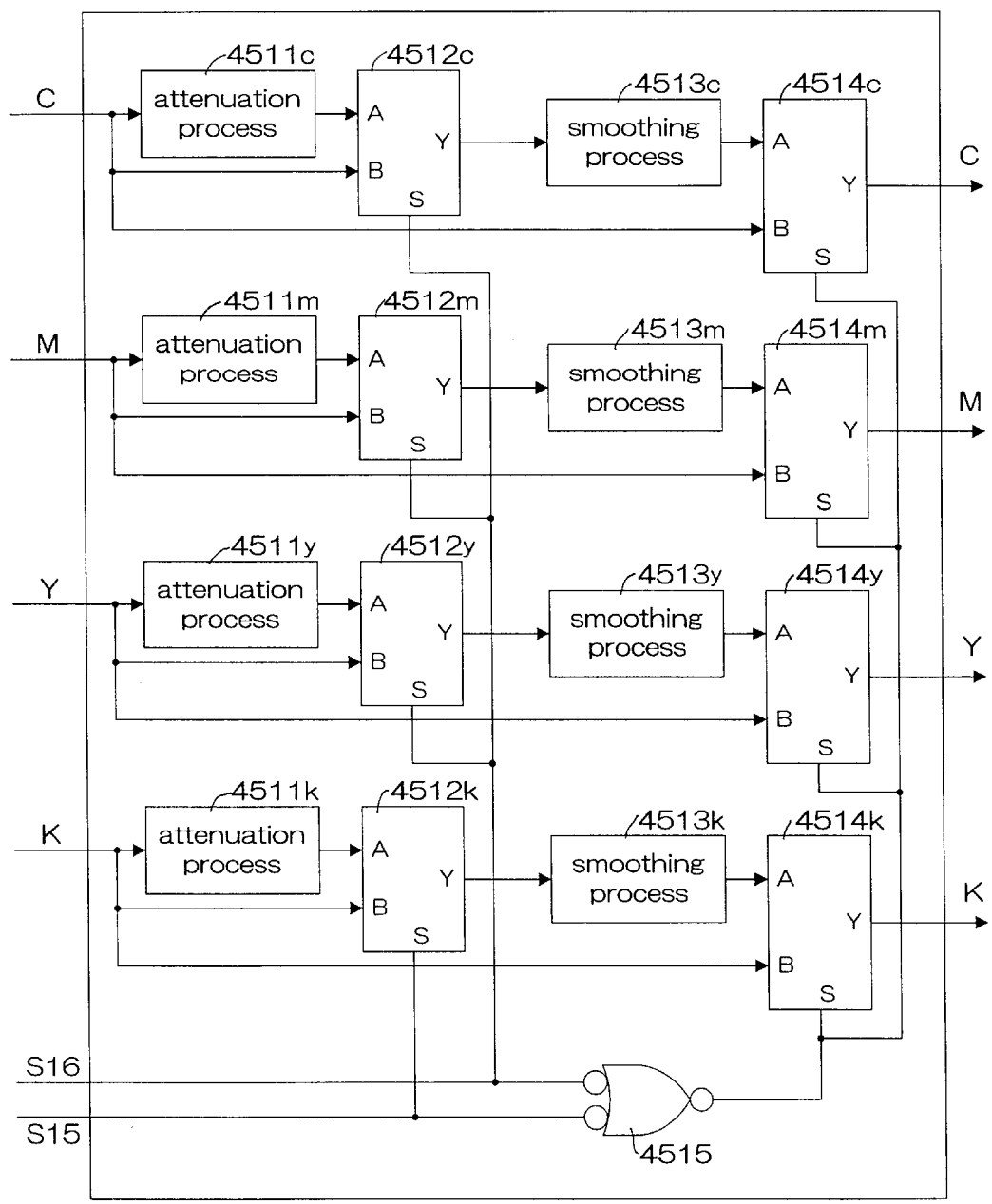
FIG. 13 is a block diagram showing an example of the construction of the image correction unit.
Figure 14:
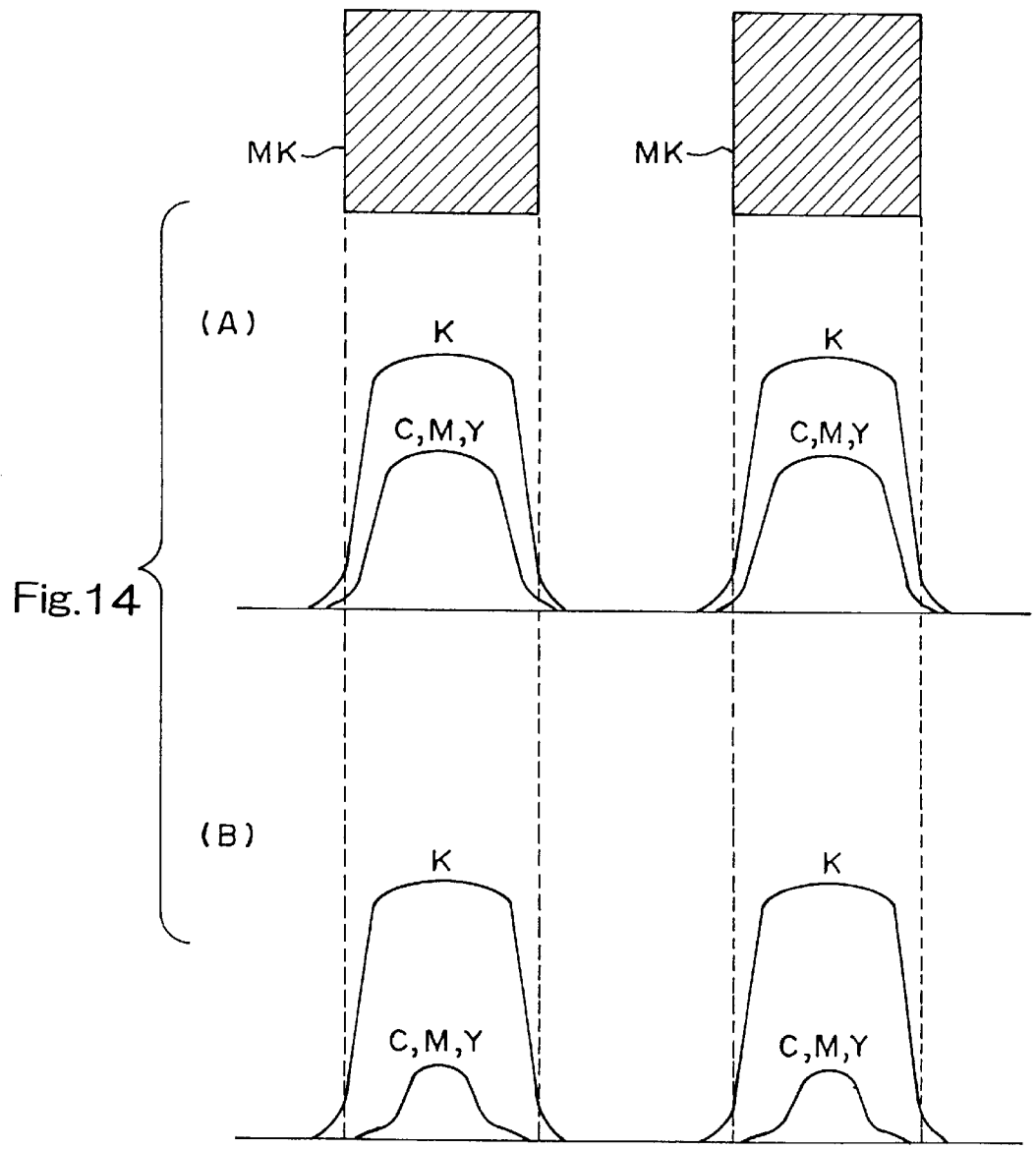
FIG. 14 shows the attenuation process performed on a monochrome halftone dot image.
Figure 15:
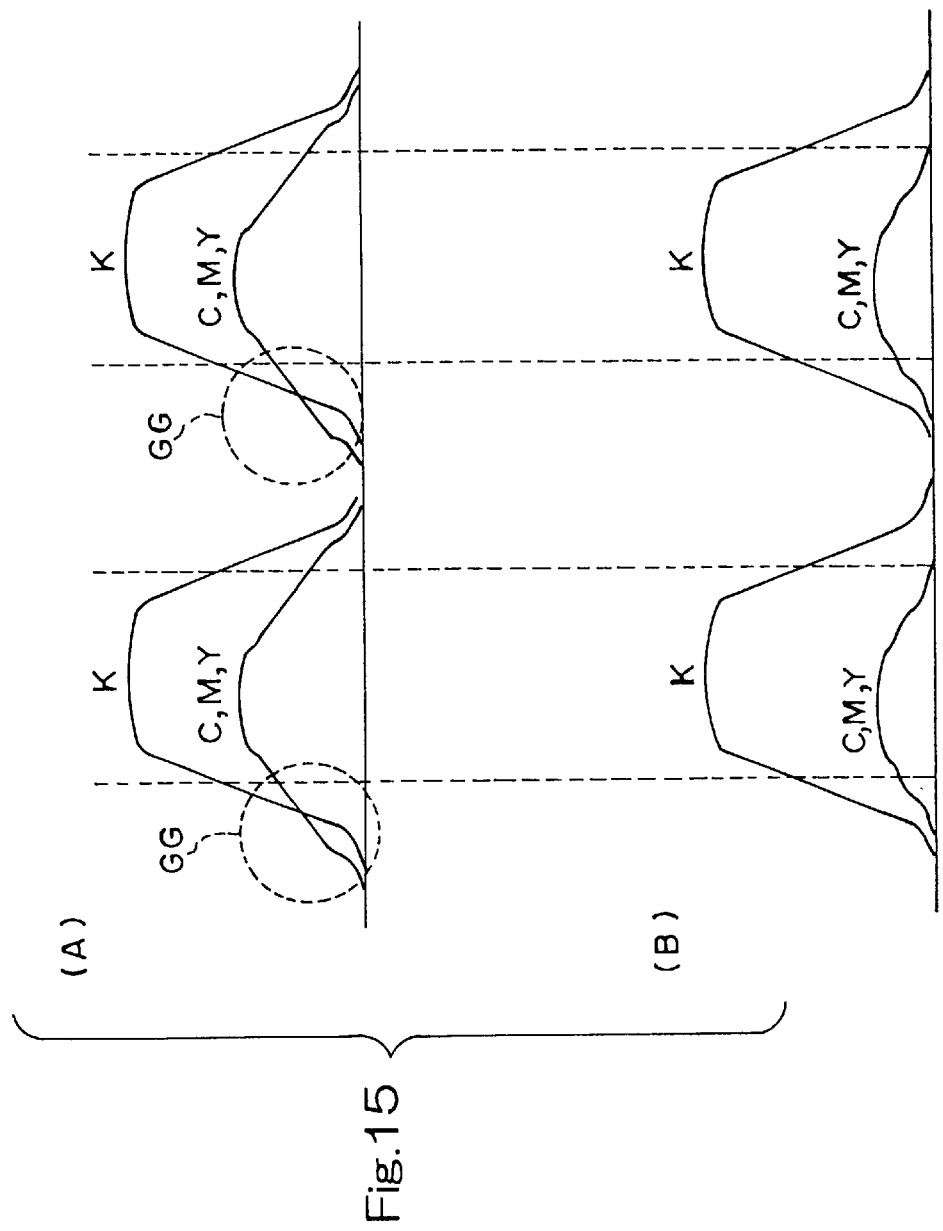
FIG. 15 shows the smoothing process.

FIG. 13 is a block diagram showing the construction of the image correction unit 451A, FIG. 14 shows the condition when the monochrome halftone dot image is subjected to attenuation processing, and FIG. 15 shows the condition when a smoothing process is performed on data subjected to attenuation processing and data which has not been attenuated.

In FIG. 13, C, M, Y, K color data output from the color correction unit 430, color halftone dot image signal S15 output from the area discrimination unit 440, and monochrome halftone dot image signal S16 are input to the image correction unit 451A. These color data are subjected to attenuation processing via attenuation processors 4511c, m, y, k, and the selectors 4512c, m, y, k select the attenuation processed data or unprocessed data. In this selection, the attenuation processed data are selected for black (K) when the color halftone dot image signal; S15 is active, and the and the attenuation processed data are selected for C, M, Y when the monochrome halftone signal S16 is active.

In this way, only the K component is reduced for color halftone images, and only the C, M, Y components are reduced for monochrome halftone dot images.

As shown in FIG. 14A, the K component is large and the C, M, Y components are about half that of K as the black halftone dot Mk in monochrome halftone dot images. Since attenuation processing is performed on the other C, M, Y components of the black halftone dot Mk, the K component is unchanged, but the C, M, Y components are smaller as shown in FIG. 14B.

Thereafter, the smoothing process is performed on the C, M, Y, K components to eliminate moire via the smoothing processors 4513c, m, y, k. When either the color halftone signal S15 or the monochrome halftone signal S16 is active, the output of the NOR element 4515 is active. As a result, the smoothed data are selected by the selectors 4514c, m, y, k, and output to the print image control interface 453. In this way the smoothed image data are output for halftone dot images.

As shown in FIG. 15A, when the smoothing process is performed on data not subjected to the attenuation process, the C, M, Y components extends markedly beyond the edge of the pixel of the black halftone dot Mk. As a result, color bleed occurs in the edge region GG. Conversely, when the attenuated data are subjected to the smoothing process, color bleed does not occur due to the very slight extension from the edge.

In this way, the halftone dot image is discriminated by distinguishing between the color halftone dots and monochrome halftone dots, and subjecting the respective halftone dot images to suitable image processing so as to suppress color bleed and muddiness, thereby improving the reproducibility of the halftone dot image.

Second Embodiment

A second embodiment of the area discrimination unit 440 is described below.

Figure 16:
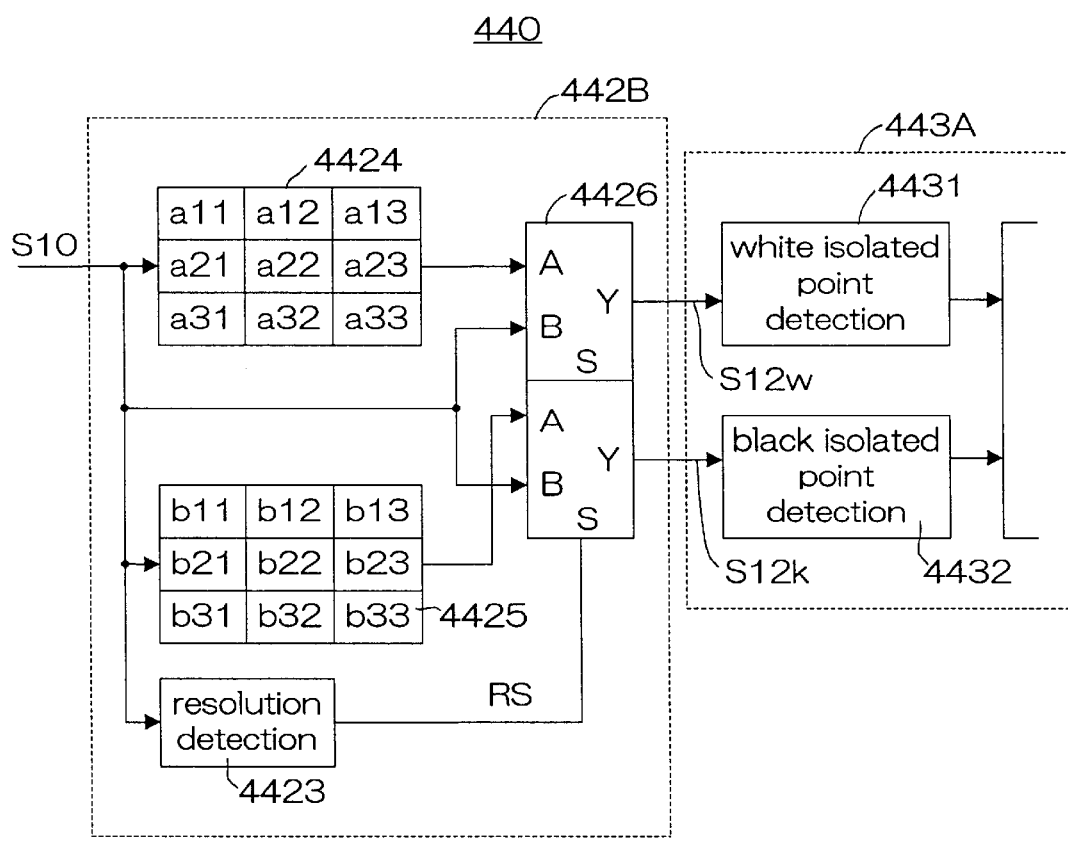
FIG. 16 is a block diagram showing an example of the construction of the halftone dot pre-processing unit.
Figure 17:
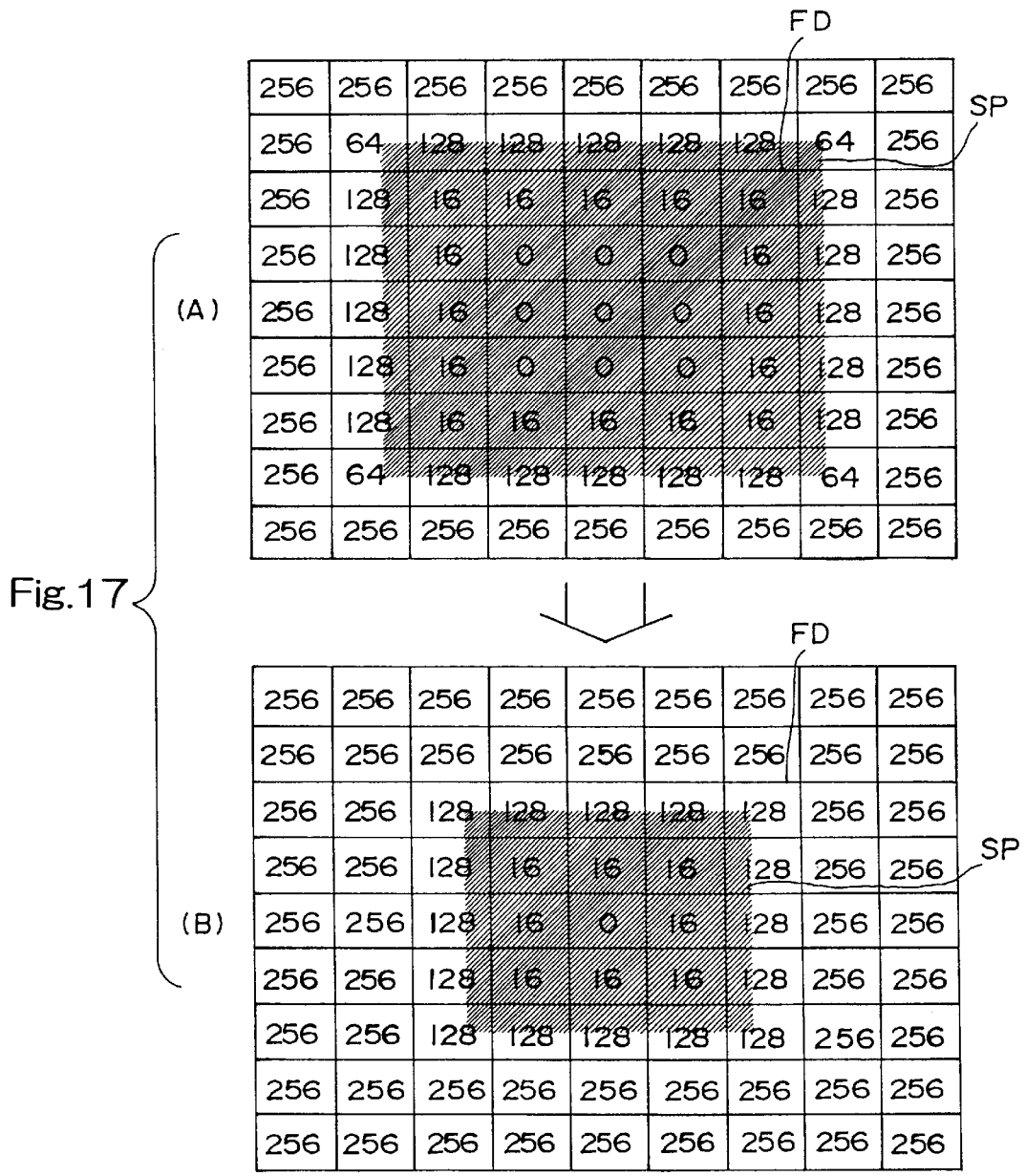
FIG. 17 shows the size of a black isolated dot before and after the opening process.

FIG. 16 is a block diagram showing the construction of the halftone dot preprocessing unit 442B, and FIG. 17 shows the size of the black isolated points SP before and after the opening process.

In FIG. 16, the halftone dot preprocessing unit 442B reduces the isolated points SP by subjecting the image data S10 to an opening process. The halftone preprocessing unit 442B comprises a 3×3 opening process minimum filter 4424 and maximum filter 4425, and selector 4426, and resolution detector 4423. The resolution detector 4423 is identical to the resolution detector of the first embodiment.

The minimum filter 4424 processes the white isolated points SP, and the maximum filter 4425 processes the black isolated points SP. The respective isolated points SP are reduced by the application of the minimum filter 4424 and the maximum filter 4425. Since the isolated points SP are refined by the opening process, the opening process is referred to as a "thinning process."

For example, the maximum filter 4425 executes a process to set the maximum value of the nine pixels subjected to the maximum filter 4425 as the target pixel PXT. That is, a process is executed pursuant to the following equation.

$$b22=\text{Max}(b11, b12, b13, b21, b22, b23, b31, b32, b33)$$

FIG. 17A shows image data before the application of the maximum filter 4425. The large value area is white, and the small value area is black. When areas having a value less than 100 are designated black, the black isolated points SP the black isolated points SP become the size indicated in the drawing, and is larger than the isolated point detection filter FD. When the image data are subjected to the opening process using the maximum filter 4425, the image data value become larger overall as shown in FIG. 17B. As a result, the black isolated points SP are reduced, and become detectable by the isolated point detection filter FD.

When the resolution RS is 400 dpi, the selector 4426 directly outputs the image data S10. When the resolution RS is 600 dpi, the selector 4426 outputs the image data treated by the opening process. Accordingly, even at a resolution RS of 600 dpi, the isolated points SP can be detected by the isolated point detection filter FD, and accurate discrimination is accomplished in the halftone image discrimination unit 443.

Moreover, it is unnecessary to modify the process content and algorithm in the halftone image discrimination unit 443 even at high resolution RS, thereby providing for the general usability of the halftone image discrimination unit 443.

Third Embodiment

A third embodiment of the area discrimination unit 440 is described below.

Figures 18, 19:
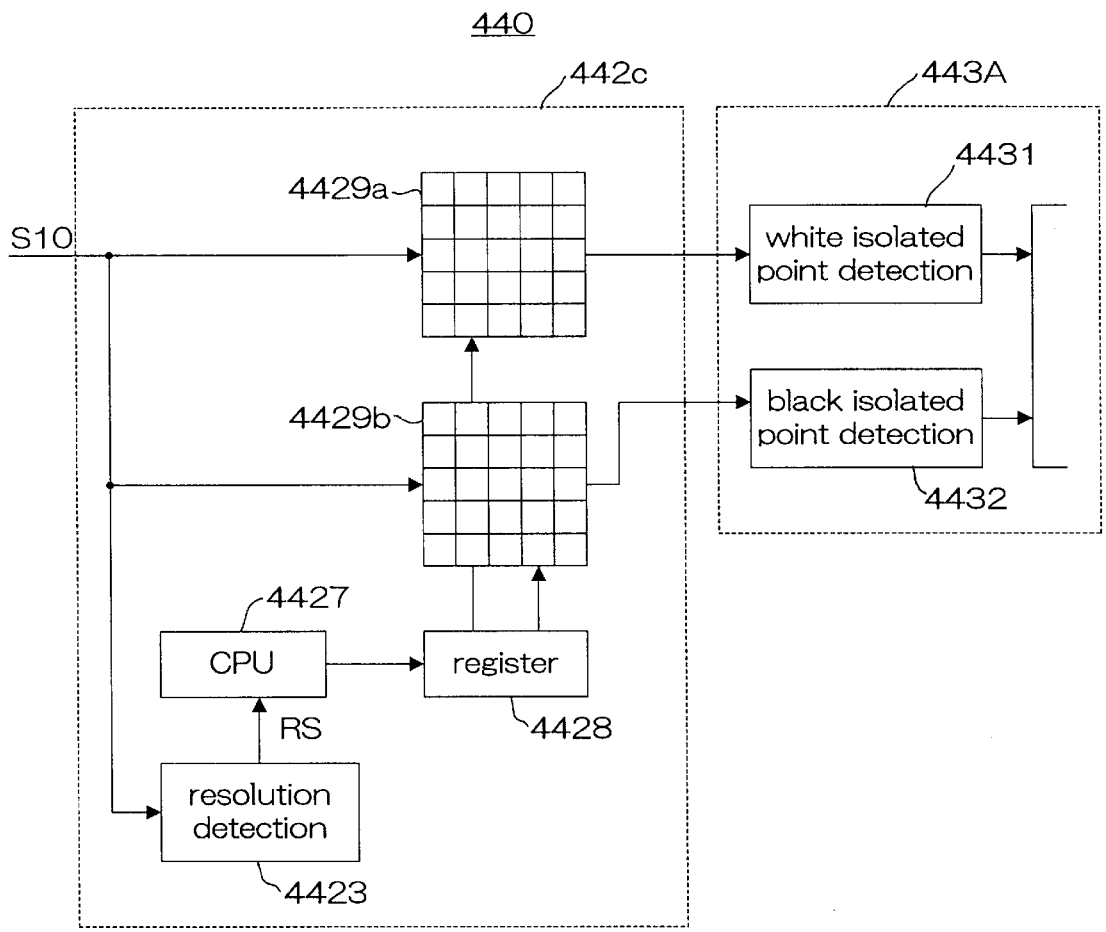
FIG. 18 is a block diagram showing an example of the construction of the halftone dot pre-processing unit.
FIG. 19 shows an example of a filter.

FIG. 18 is a block diagram showing the construction of the halftone dot preprocessor 442C, and FIG. 19 shows the filter 4429a.

In FIG. 18, the halftone dot preprocessor 442C reduces the isolated points SP by subjecting the image data S10 to a filtering process. The halftone dot preprocessor 442C comprises 5×5 filter 4429a and 4429b, a CPU 4427, a register 4428, and a resolution detector 4423. The resolution detector 4423 is identical to the resolution detector of the first embodiment.

The coefficients and process contents of the filters 4429a and 4429b are set in the register 4428 via a process executed by the CPU 4427, and processing is executed in accordance with the set contents. The filters 4429a and 4429b operate as Laplacian filters or opening filters in accordance with the contents set in the register 4428. The size of the filters is variable.

For example, the filter 4429a may be a minimum filter used for the opening process, and have a size of 5×5, 3×3 or the like.

When the filter 4429a is a 5×5 minimum filter as shown in FIG. 19, the value of the target pixel PXT satisfies the following equation.

$$d33=\text{Min}(d11, d12, d13, d14, d15, d21, d22, d23, d24, d25, d31, d32, d33, d34, d35, d41, d42, d43, d44, d45, d51, d52, d53, d54, d55)$$

That is, the value of the target pixel PXT is the minimum value among the 25 (5×5) pixels. When the filter 4429a is a 3×3 minimum filter as shown in FIG. 19, the value of the target pixel PXT satisfies the following equation.

$$d33=\text{Min}(d22, d23, d24, d32, d33, d34, d42, d43, d44)$$

That is the value of the target pixel PXT is the minimum value among the 9 (3×3) pixels.

In this way, the CPU 4427 sets the various coefficients in the register 4428 by executing a program, so as to variously modify the type, size, and process content of the filters 4429a and 4429b. Accordingly, the memory capacity required for processing is reduced by reducing the size as much as possible, thereby realizing lower costs.

The halftone dot preprocessor 442C of the third embodiment executes pa process to reduce the isolated points SP when the resolution RS is 600 dpi. As a result, the isolated points SP can be detected by the isolated point detection filter FD, and the halftone dot image discrimination unit 443 performs accurate discrimination.

Fourth Embodiment

A fourth embodiment of the area discrimination unit 440 is described below.

Figure 20:
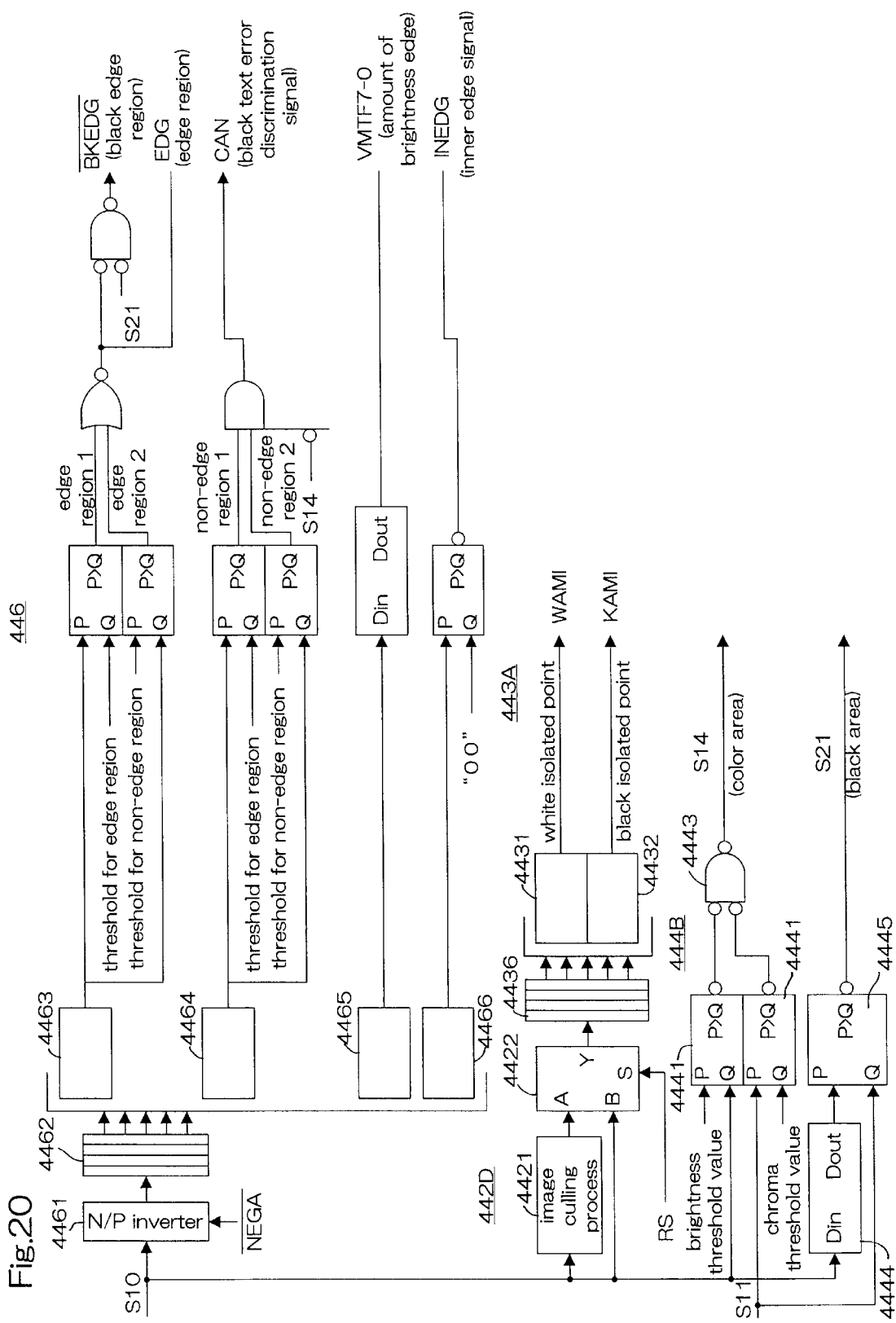
FIG. 20 shows an example of the construction of the halftone dot pre-processing unit and the color/monochrome discrimination unit.
Figure 21:
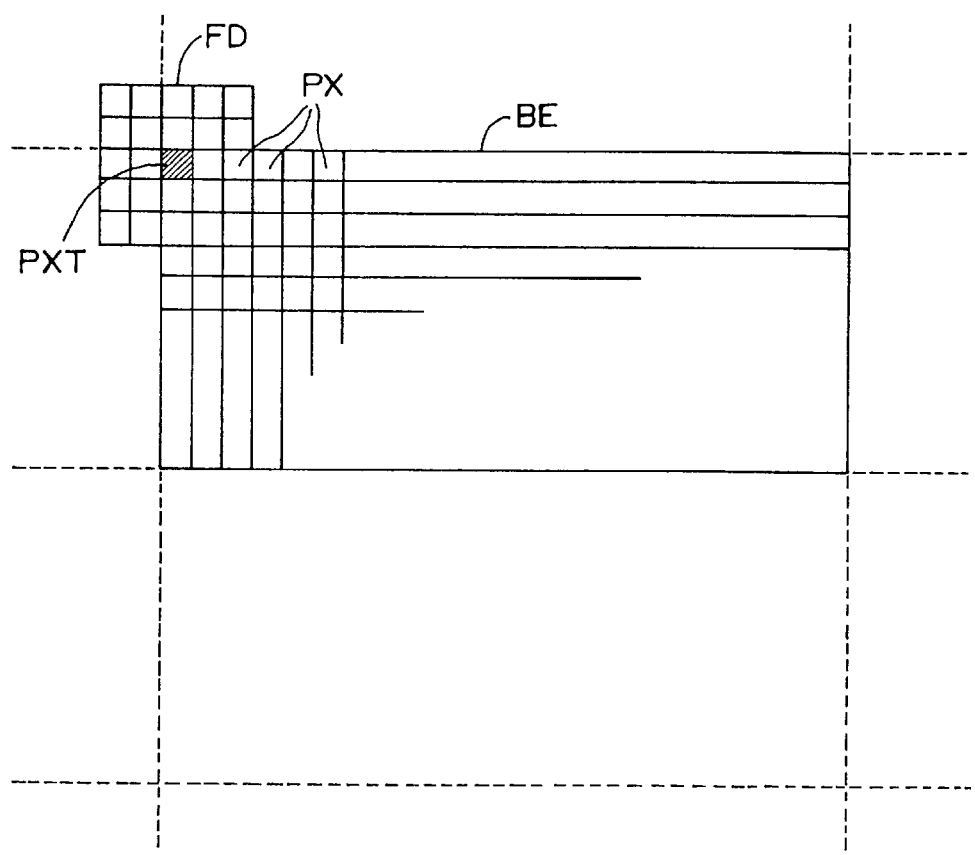
FIG. 21 illustrates the halftone dot image discrimination method.

FIG. 20 shows the construction of the halftone dot preprocessor 442D and the color/monochrome discrimination unit 444B.

In FIG. 20 the halftone dot preprocessor 442D uses the same image culling processor 4421 and selector 4422 shown in FIG. 5. In the halftone image discrimination unit 443A, four line memories 4436 are used, and the isolated point detection filter FD is applied to five lines simultaneously. A signal WAMI representing a white isolated point, or a signal KAMI representing a black isolated point, is output from the white isolated point detector 4431 and the black isolated point detector 4432, respectively. This signal is input to the previously mentioned white isolated point counter 4433 or the black isolated point counter 4434.

In the color/monochrome discrimination unit 444B, a discrimination signal S14 representing a color area is output via the comparators 4441 and 4442, and the NAND element 4443. The black threshold table 4444 is applied to the image data S11 representing brightness, and this output is compared to the image data S11 representing chroma via the comparator 4445, and a discrimination signal S21 representing a black area is output.

In the edge detector 446, various processes are performed to accomplish edge detection using the negative-positive inverter 4461 for inverting negative-to-positive as necessary, a line memory 4462, a primary micro filter 4463, a secondary micro filter 4464, a Laplacian filter 4465, and an internal edge detection filter 4466.

In the previously described embodiments, the halftone dot preprocessor 442, halftone dot image discrimination unit 443, color/monochrome discrimination unit 444, halftone dot output unit 445, area discrimination unit 440, and image processing unit 205 may be modified entirely or in part, including construction, process content, processing sequence and the like insofar as such modification does not depart from the scope of the present invention. The present invention may be applied to various apparatuses other than a copier.

According to the previously described embodiments, halftone dot image discrimination can be accurately accomplished at various resolutions when the resolution increases and when the type of resolution increases. In this way cost increases can be suppressed as much as possible.

According to the aforesaid embodiments, when subjecting a halftone dot image to image processing, monochrome and color halftone dot images can be processed by the execution of respectively suitable processes, thereby preventing color bleed and muddiness.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing device, comprising:
    a halftone dot image discrimination unit for discriminating whether or not an image contained in a predetermined area is a halftone dot image;
    a color/monochrome discrimination unit for discriminating whether an image contained in the predetermined area is a color image or a monochrome image;
    a first image processor for executing a first image process on the image contained in the predetermined area when the image contained in the predetermined area is a halftone dot image and a color image; and
    a second image processor for executing a second image process on an image contained in the predetermined area when the image contained in the predetermined area is a halftone dot image and a monochrome image.

2. An image processing device comprising:
    dividing means for dividing image data into blocks;
    a halftone dot image discrimination unit for discriminating whether or not the image contained in each block is a halftone dot image;
    a color/monochrome discrimination unit for discriminating whether the image contained in each block is a color image or monochrome image;
    a first image processor for executing a first image process on the image contained in a block when the image contained in that block is a halftone dot image and a color image; and
    a second image processor for executing a second image process on the image contained in a block when the image contained in that block is a halftone dot image and a monochrome image.

3. An image processing device as claimed in claim 2, wherein the first image processor executes an attenuation process relative to the black component of the image data.

4. An image processing device as claimed in claim 2, wherein the second image processor executes attenuation process relative to the cyan, magenta, and yellow components of the image data.

5. An image discrimination method, comprising the steps of:
    discriminating whether or not an image based on inputted image data is a halftone dot image;
    discriminating whether the image is a color image or a monochrome image; and
    deciding whether the image is a color halftone dot image or a monochrome halftone dot image according to a result of said discrimination.

6. An image discrimination method, comprising the steps of:
    discriminating whether or not an image based on inputted image data is a halftone dot image in each predetermined area;
    discriminating whether the image is a color image or a monochrome image in said each predetermined area;
    deciding that the image is a color halftone dot image in case that the image is a halftone dot image and a color image, and that the image is a monochrome halftone dot image in case that the image is a halftone dot image and a monochrome image; and
    executing an image process according to the decision whether the image is a color halftone dot image or a monochrome halftone dot image on image data in the predetermined area.

* * * * *